US012078310B2

(12) United States Patent
Mun

(10) Patent No.: US 12,078,310 B2
(45) Date of Patent: Sep. 3, 2024

(54) LAMP FOR VEHICLE

(71) Applicant: HYUNDAI MOBIS CO., LTD., Seoul (KR)

(72) Inventor: Sun Kwon Mun, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/361,794

(22) Filed: Jul. 28, 2023

(65) Prior Publication Data

US 2024/0133530 A1 Apr. 25, 2024
US 2024/0230044 A9 Jul. 11, 2024

(30) Foreign Application Priority Data

Oct. 19, 2022 (KR) ........................ 10-2022-0134928

(51) Int. Cl.
*F21S 41/265* (2018.01)
*F21S 41/143* (2018.01)

(52) U.S. Cl.
CPC ........... *F21S 41/265* (2018.01); *F21S 41/143* (2018.01)

(58) Field of Classification Search
CPC .............................. F21S 41/265; F21S 41/143
See application file for complete search history.

(56) References Cited

U.S. PATENT DOCUMENTS 9,982,864 B2 * 5/2018 Fukui .................... F21S 43/315
11,098,868 B2 * 8/2021 Sakaguchi ............ F21S 41/143

* cited by examiner

*Primary Examiner* — Matthew J. Peerce
(74) *Attorney, Agent, or Firm* — DLA Piper LLP US

(57) ABSTRACT

A lamp for a vehicle includes a light source that outputs light, and a multi-facet lens, to which the light output from the light source is input, that outputs the light to an outside after the light passes therethrough, and including a plurality of facets, the multi-facet lens includes a central facet area including a plurality of facets provided in a central area in a leftward/rightward direction, and a peripheral facet area including a plurality of facets provided on one side of the central area in the leftward/rightward direction. Horizontal focuses and vertical focuses of at least some of the plurality of facets provided in the central facet area correspond to each other, and horizontal focuses and vertical focuses of some of the plurality of facets provided in the peripheral facet area are different.

19 Claims, 6 Drawing Sheets

LAMP FOR VEHICLE

CROSS-REFERENCE TO RELATED APPLICATION

This application claims the benefit of priority to Korean Patent Application No. 10-2022-0134928, filed in the Korean Intellectual Property Office on Oct. 19, 2022, the entire contents of which are incorporated herein by reference.

TECHNICAL FIELD

The present disclosure relates to a lamp for a vehicle, and a vehicle including the same.

BACKGROUND

As an importance of an aesthetic aspect required for vehicles has been increased, requirements for an aesthetic aspect of lamps mounted on the vehicles also have been increased. In particular, among lamps for vehicles, headlamps mounted on a front side of a vehicle are required to have a slimmed structure, of which a size in an upward/downward direction is small, to increase an aesthetic aspect.

Meanwhile, when the structure of the lamps is slimmed, an optical efficiency is degraded. For example, when the lamp having a slimmed structure is operated according to a conventional lamp driving scheme, it is difficult to implement the required performance. Accordingly, the lamp having the slimmed structure requires power consumptions that are higher than the electric power consumed to operate the conventional lamp, and thus the optical efficiency of the lamp is degraded. In recent years, studies on lamps for vehicles equipped with a multi-facet lens (MFL), which may prevent both degradation of an optical efficiency and contribute slimness of a lamp structure have been actively made.

Meanwhile, lenses may be classified into single vision lenses and anamorphic lenses according to characteristics of focuses. Single vision lenses are lenses, of which a horizontal focus and a vertical focus coincide with each other, and anamorphic lenses are lenses, of which a horizontal focus and a vertical focus are different. Then, facets of the multi-facet lens may have a shape of a single vision lens, or may have a shape of an anamorphic lens. Among them, in an anamorphic lens, degrees, by which light that passes through the anamorphic lens is spread in a vertical direction and a horizontal direction, are different. Accordingly, when a light distribution pattern of a lamp that forms a low-beam light distribution pattern is formed by using an anamorphic lens, a hot zone required for the low-beam light distribution pattern by the rules cannot be properly implemented.

Meanwhile, the single vision lens has a property of condensing light. Accordingly, when a low-beam light distribution pattern is formed by using a single vision lens, a spread zone required for the low-beam light distribution pattern by the rules cannot be properly implemented.

That is, according to the conventional technology, when the low-beam light distribution pattern is formed by using the multi-facet lens, it is necessary for a shape of the multi-facet lens to be optimized for forming the low-beam light distribution pattern.

SUMMARY

The present disclosure has been made to solve the above-mentioned problems occurring in the prior art while advantages achieved by the prior art are maintained intact.

An aspect of the present disclosure provides a lamp for a vehicle equipped with a multi-facet lens, which may form a low-beam light distribution pattern that may satisfy the rules required for the low-beam light distribution pattern.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp for a vehicle includes a light source that outputs light, and a multi-facet lens, to which the light output from the light source is input, that outputs the light to an outside after the light passes therethrough, and including a plurality of facets, the multi-facet lens includes a central facet area including a plurality of facets provided in a central area in a leftward/rightward direction, and a peripheral facet area including a plurality of facets provided on one side of the central area in the leftward/rightward direction, horizontal focuses and vertical focuses of at least some of the plurality of facets provided in the central facet area correspond to each other, and horizontal focuses and vertical focuses of some of the plurality of facets provided in the peripheral facet area are different.

Furthermore, horizontal focuses and vertical focuses of all the facets provided in the central facet area may coincide with each other, horizontal focuses and vertical focuses of all of the facets provided in the peripheral facet area may be different, and upward/downward focuses and forward/rearward focuses of all the facets provided in the central facet area and upward/downward focuses and forward/rearward focuses of all of the facets provided in the peripheral facet area may correspond to each other.

Furthermore, the upward/downward focuses and the forward/rearward focuses of all the facets provided in the central facet area and the upward/downward focuses and the forward/rearward focuses of all of the facets provided in the peripheral facet area may correspond to each other.

Furthermore, horizontal focuses of all of the facets provided in the peripheral facet area may be located on a rear side of the light source.

Furthermore, the light output from the central facet area may form a central light distribution area of a low-beam light distribution pattern, and the light output from the peripheral facet area may form a peripheral light distribution area of the low-beam light distribution pattern.

Furthermore, the peripheral facet area may include a first peripheral area disposed on any one of a left side and a right side of the central facet area, and a second peripheral area disposed on the other one of the left side and the right side of the central facet area, and a width of the central facet area in the leftward/rightward direction "W" may be smaller than widths of the first peripheral area and the second peripheral area in the leftward/rightward direction "W".

Furthermore, the plurality of facets provided in the central facet area and the plurality of facets provided in the peripheral facet area may be arranged along an upward/downward direction "H".

Furthermore, the lamp may further include an inner lens provided on a front side of the light source and a rear side of the multi-facet lens, and from which the light is output to a front side after the light is input and passes therethrough, the inner lens may include a light input part, to which the light is input, and a reflection part extending from the light input part to the front side and that totally reflects the light input to the light input part, the light input part may include a first light input part, to which any portion of the light input to the light input part is input, the light totally reflected by the reflection part may travel in parallel to a forward/rearward direction, and the light input to the first light input part may travel in parallel to the forward/rearward direction.

Furthermore, a horizontal focus and a vertical focus of the first light input part may coincide with each other, and the focuses of the first light input part may correspond to a focus (CF) of at least one of the plurality of facets provided in the central facet area.

Furthermore, the first light input part may include a first light input area defining a left part of the first light input part, and a second light input area defining a right part of the first light input part, upward/downward heights of vertical focuses of the first light input area and the second light input area may correspond to each other, and horizontal focuses of the first light input area and the second light input area may be spaced apart from each other in the leftward/rightward direction "W".

Furthermore, the horizontal focus of the first light input area may be disposed on a left side of the horizontal focuses of at least some of the plurality of facets provided in the central facet area, when the lamp is viewed from an upper side, and the horizontal focus of the second light input area may be disposed on a right side of the horizontal focuses of at least some of the plurality of facets provided in the central facet area, when the lamp is viewed from the upper side.

Furthermore, the first light input part may have a shape that is convex to a rear side.

Furthermore, the light input part may further include a second light input part, to which the other portion of the light input to the light input part is input, and the second light input part may extend from a front end of the first light input part to a rear side.

Furthermore, a concave area having a shape that is concave to a rear side and facing the light source may be provided on a rear side of the inner lens, a front surface of the first light input part may define a front part of the concave area, an inner peripheral surface of the second light input part may define a circumferential part of the concave area, and the circumferential part of the concave area may extend from the front part to a rear side.

Furthermore, the inner lens may further include a light output part extending from the reflection part, defining a front surface of the inner lens, from which at least a portion of the light input to the light input part is output, and provided at a front end of the reflection part, and the light output part may be disposed on a rear side of the focus of the central facet area.

Furthermore, the light output part may have a shape that extends in a direction that is parallel to a leftward/rightward direction "W" when an upper side of the lamp is viewed.

Furthermore, an area having a shape that is convex toward a front side when the lamp is viewed from an upper side may be provided at a periphery of the light output part in a leftward/rightward direction "W", and the light output from an area provided at the periphery of the light output part in the leftward/rightward direction "W" may travel to a front side, and may travel while being inclined toward the central facet area.

Furthermore, a width of the light input part in the leftward/rightward direction "W" may be larger than a width of the multi-facet lens in the leftward/rightward direction "W".

Furthermore, the light output part may have a shape that is convex toward a front side when the lamp is viewed from a left side and a right side.

Furthermore, the reflection part may be provided between a rear end of the light input part and the light output part and having a curved surface to have a shape that is convex toward a rear side.

According to another aspect of the present disclosure, a vehicle includes a lamp, the lamp includes a light source that outputs light, and a multi-facet lens, to which the light output from the light source is input, that outputs the light to an outside after the light passes therethrough, and including a plurality of facets, the multi-facet lens includes a central facet area including a plurality of facets provided in a central area in a leftward/rightward direction, and a peripheral facet area including a plurality of facets provided on one side of the central area in the leftward/rightward direction, horizontal focuses and vertical focuses of at least some of the plurality of facets provided in the central facet area correspond to each other, and horizontal focuses and vertical focuses of some of the plurality of facets provided in the peripheral facet area are different.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

A forward/rearward direction, a leftward/rightward direction, and an upward/downward direction in the specification may be understood as being perpendicular to each other. For example, a forward direction may be defined as a direction, in which light output from a light source travels, and a rearward direction may be defined as an opposite direction to the forward direction. Furthermore, the leftward/rightward direction may be defined as a direction, a peripheral facet area and a central facet area, which will be described below, are alternately arranged. The forward/rearward direction and the leftward/rightward direction may be understood as a concept included in a horizontal direction. The upward/downward direction may be defined as a direction that is perpendicular to the horizontal direction, and may be named the vertical direction.

Hereinafter, a lamp 10 (hereinafter, referred to as a 'lamp') for a vehicle according to a first embodiment of the present disclosure will be described with reference to the drawings.

Figure 1:
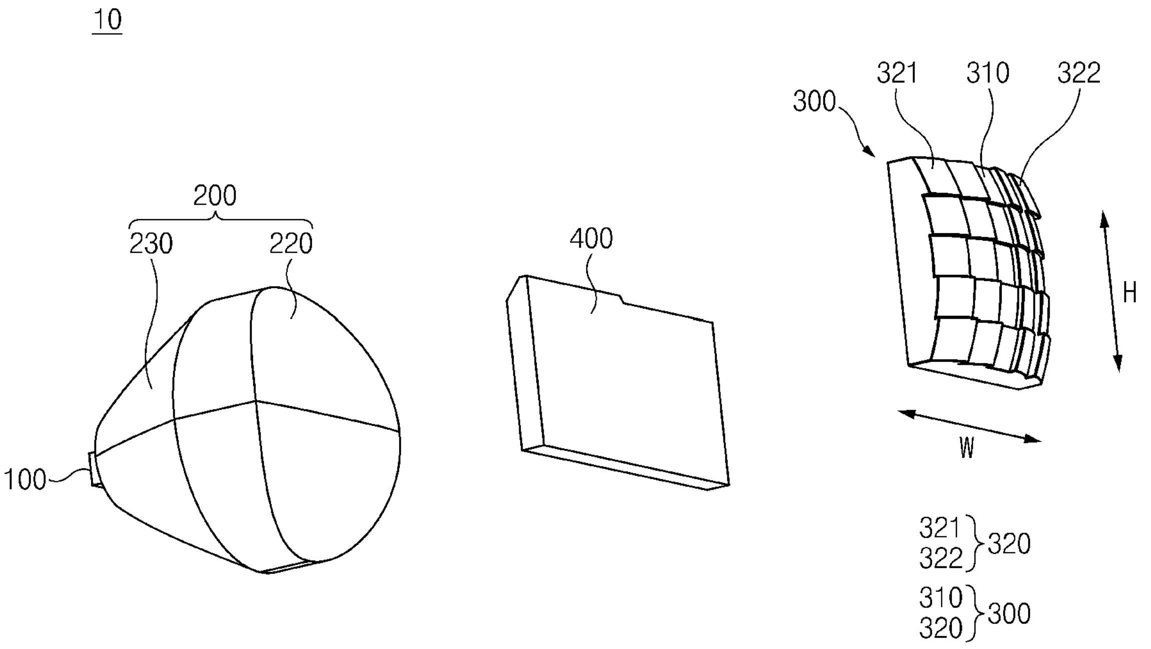
FIG. 1 is a bottom perspective view of a lamp for a vehicle according to a first embodiment of the present disclosure.

Referring to FIG. 1, the lamp 10 may be a configuration for providing a visibility to a driver of a vehicle provided with the lamp or informing a user on an outside of presence of a vehicle. For example, the lamp 10 may be provided on a front side of the vehicle, and the lamp 10 provided on a front side of the vehicle may allow a user who is on board to secure a visibility of a front side.

The lamp 10 may be operated to irradiate a low beam or a high beam to a front side of the vehicle. For example, when the lamp 10 irradiates the light to the front side of the vehicle, the light may have a specific light distribution pattern (hereinafter, a low-beam light distribution pattern). A shape of the low-beam light distribution pattern will be described in detail in the following. The lamp 10 may include a light source 100, an inner lens 200, a multi-facet lens (MFL) 300, and a shield 400.

The light source 100 may output the light toward the inner lens 200. The light source 100 may be disposed on a rear side of the inner lens 200. The light source 100, for example, may be an LED. However, the spirits of the present disclosure are not necessarily limited thereto, and the light source 100 may be a known means that may output the light.

Figure 2:
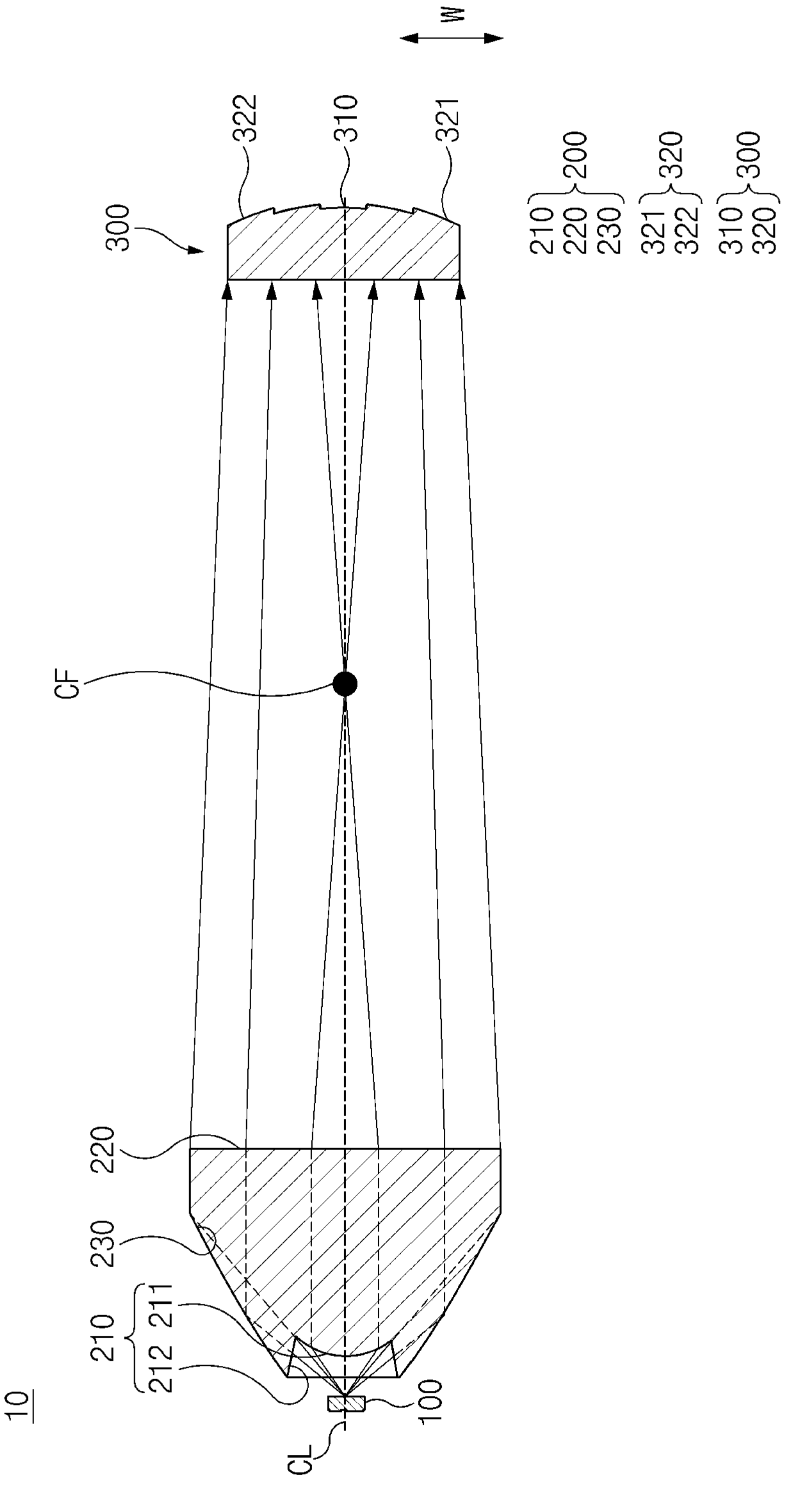
FIG. 2 is a transverse cross-sectional view, which is obtained by cutting a lamp for a vehicle in a horizontal direction, according to a first embodiment of the present disclosure.
Figure 3:
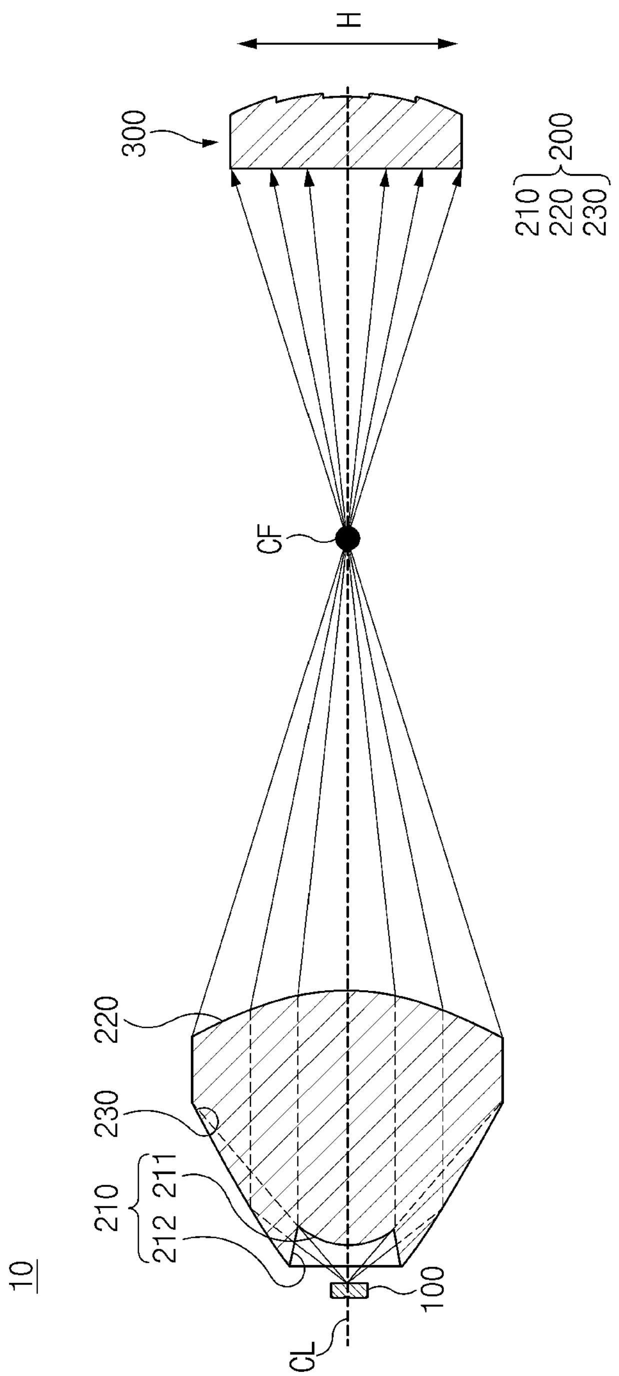
FIG. 3 is a longitudinal cross-sectional view, which is obtained by cutting a lamp for a vehicle in an upward/downward direction, according to a first embodiment of the present disclosure.
Figure 4:
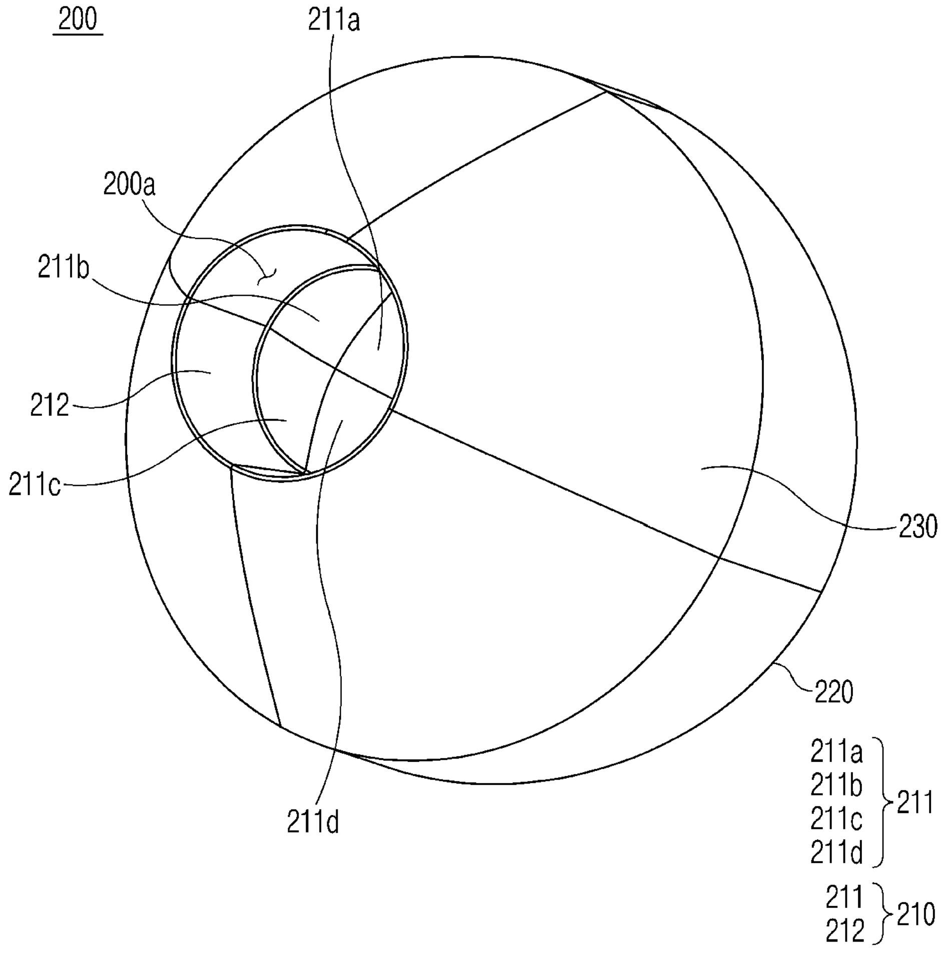
FIG. 4 is a perspective view of an inner lens according to a first embodiment of the present disclosure.

Referring further to FIGS. 2 to 4, the inner lens 200 may transmit the light output from the light source 100. The light output from the light source 100 may be input to the inner lens 200. Furthermore, the light input to the inner lens 200 may be output toward the multi-facet lens 300 after passing through the inner lens 200 in parallel to the horizontal direction. The inner lens 200 may be a collimator lens. As an example, the inner lens 200 may be a total internal reflection (TIR) collimator lens that totally reflects the light output from the light source 100 in an interior thereof and then converts the light into parallel light. The inner lens 200 may include a light input part 210, a light output part 220, and a reflection part 230.

Referring to FIG. 2, the light input part 210 may be defined as an area of the inner lens 200, to which the light output from the light source 100 is input. The light input part 210 may include a first light input part 211 and a second light input part 212. Any portion of the light input to the light input part 210 may be input to the first light input part 211.

The light having an angle of a first spreading angle or less, which is output from the light source 100, may be input to the first light input part 211. For example, a width of a light bundle formed by the light input to the first light input part 211 may become larger as it goes to a front side, and the light bundle may have a cone shape having the first spreading angle at an apex thereof. In a more detailed example, the first spreading angle may be defined as an angle that is defined by two generatrix lines when a cone is cut by an imaginary plane that passes through an apex of the cone having the first spreading angle and a center of a bottom surface thereof.

In other words, referring to FIGS. 2 and 3, the first spreading angle may be defined as an angle between an imaginary line that extends between the light source 100 and an upper front end of the first light input part 211 and an imaginary line that extends between the light source 100 and a lower front end of the first light input part 211.

The first light input part 211, as an example, may have a partial shape of an aspheric lens. Furthermore, the first light input part 211, as an example, may have a partial shape of a collimator lens that generates parallel light. The first light input part 211 may have a shape that is convex to a rear side. For example, the first light input part 211 may have a shape, in which widths of the first light input part 211 in a leftward/rightward direction "W" and a vertical direction "H" become smaller as they go to a rear side when the lamp 10 is viewed from an upper side.

Furthermore, focuses of the first light input part 211 in the horizontal direction and the vertical direction, as an example, may coincide with each other. The horizontal focus may mean a location of an observed focus when the lamp 10 is viewed from an upper side. Furthermore, the vertical focus may mean a location of the observed focus when the lamp 10 is viewed from a left side or a right side. In more detail, the horizontal focus may mean a focus on a horizontal cross-section of the lamp 10, and the vertical direction may mean a focus on a vertical cross-section of the lamp 10. In other words, the first light input part 211 may have one focus (a single focus).

Meanwhile, although FIG. 2, FIG. 3, and the like illustrate that the light that passes through the first light input part 211 are parallel to each other, the light that passes through the first light input part 211 may travel while being inclined to a center line CL to correspond to a central facet focus CF. The first light input part 211 may be divided into a first light input area and a second light input area, focuses of which are different.

The first light input area may define a left part of the first light input part 211. A vertical focus of the first light input area may correspond to a height of the central facet focus CF, which will be described below. Furthermore, a horizontal focus of the first light input area may be spaced apart from the central facet focus CF in the leftward/rightward direction "W". For example, when the lamp 10 is viewed from an upper side, the horizontal focus of the first light input area may be disposed on a left side of the central facet focus CF.

The second light input area may define a right part of the second light input part 212. A vertical focus of the second light input area may correspond to the height of the central facet focus CF, which will be described below. A horizontal focus of the second light input area may be spaced apart from the central facet focus CF in the leftward/rightward direction "W". For example, when the lamp 10 is viewed from an upper side, the horizontal focus of the second light input area may be disposed on a right side of the central facet focus CF.

In other words, the horizontal focus of the first light input area, and the horizontal focuses of the central facet focus CF and the second light input area may be sequentially arranged to be spaced apart from each other along the leftward/rightward direction "W".

In other words, the horizontal focus of the first light input area may be disposed on a left side of the central facet focus CF, and the horizontal focus of the second light input area may be disposed on a right side of the central facet focus CF. Accordingly, the lights, which are output from the first light input area and the second light input area, of areas that are wider in the leftward/rightward direction may be irradiated to targeted locations as compared with when the horizontal focuses of the first light input area and the second light input area overlap the central facet focus CF.

Referring back to FIG. 4, the first light input part 211 may be divided into a plurality of parts, focuses of which are different. For example, the plurality of first light input parts 211 may be classified into four parts that are arranged along a circumferential direction. The circumferential direction may be defined as a direction that is rotated about a forward/rearward rotational axis that passes the light source 100. The four parts may include a first part 211*a*, a second part 211*b*, a third part 211*c*, and a fourth part 211*d*.

The first part 211*a* may be defined as a right upper area of the first light input part 211. The second part 211*b* may be defined as a left upper area of the first light input part 211. The second part 211*b* may be disposed on a left side of a lens of the first part 211*a*. The third part 211*c* may be defined as a left lower area of the first light input part 211. The third part 211*c* may be disposed on a lower side of the second part 211*b*. The fourth part 211*d* may be defined as a right lower area of the first light input part 211. The fourth part 211*d* may be disposed on a right side of the third part 211*c* and a lower side of the first part 211*a*. Furthermore, the first light input area may be defined by the second part 211*b* and the third part 211*c*, and the second light input area may be defined by the first part 211*a* and the fourth part 211*d*.

A portion of the light input to the light input part 210, which is different from the light input to the first light input part 211, may be input to the second light input part 212. For example, the light having an angle of not less than the first spreading angle and not more than a second spreading angle, which is output from the light source 100, may be input to the second light input part 212.

For example, the light having an angle of not less than the first spreading angle and not more than a second spreading angle, which is output from the light source 100, may be input to the second light input part 212. For example, a width of a light bundle formed by the light input to the second light input part 212 may become larger as it goes to a front side, and the light bundle may have a cone shape having the second spreading angle at an apex thereof. In a more detailed example, the second spreading angle may be defined as an angle that is defined by two generatrix lines when a cone is cut by an imaginary plane that passes through an apex of the cone having the second spreading angle and a center of a bottom surface thereof.

In other words, referring to FIGS. 2 and 3, the second spreading angle may be defined as an angle between an imaginary line that extends between the light source 100 and an upper rear end of the second light input part 212 and an imaginary line that extends between the light source 100 and a lower rear end of the second light input part 212. Remaining portions, except for the light input to the light input area 210, which is input to the first light input part 211, may be input to the second light input part 212.

The light input to the second light input part 212 may be refracted to be inclined to an upper side and travel. Furthermore, the second light input area 212 may extend from a front end of the first light input part 211 to a rear side.

A concave area that faces the light source 100 in the forward/rearward direction may be provided in the light input part 210. The concave area may be provided on a rear side of the light input part 210. Furthermore, an entire surface of the first light input part 211 may define a front part of the concave area. Furthermore, an inner peripheral surface of the second light input part 212 may define a circumferential part. The circumferential part of the concave area may have a shape that extends from a front part of the concave area to a rear side. Furthermore, a rear side of the concave area may have an opened shape. The concave area may define a light input recess 200*a* that is recessed forwards, in the light input part 210. For example, the light input recess 200*a* may be surrounded by the concave area.

Referring back to FIGS. 2 and 3, the light output part 220 may be defined as an area, from which the light input to the light input part 210 is output toward the multi-facet lens 300. The light output part 220 may be provided on a front side of the reflection part 230, which will be described below. For example, the light output part 220 may extend from a front end of the reflection part 230 that will be described below to a front side. Then, the center line CL may be defined as an imaginary line that extends in the forward/rearward direction while passing through the light source 100.

Furthermore, the light output part 220 may have a shape that is convex to a front side when the lamp 10 is viewed from a right side. For example, as illustrated in FIG. 3, the light output part 220 may have a shape, of which a width in the upward/downward direction becomes gradually smaller as it goes to a front side when the lamp 10 is viewed from a right side. Through the shape that is convex in the upward/downward direction "H" of the light output part 220, a focus of the light output from the light output part 220 in the vertical direction may be formed between the light output part 220 and the multi-facet lens 300.

Furthermore, when the lamp 10 is viewed from an upper side, the light output part 220 may extend in parallel to the leftward/rightward direction "W". For example, as illustrated in FIG. 2, a front surface of the light output part 220 may be observed as a linear shape that is parallel to the leftward/rightward direction "W" when the lamp 10 is viewed from an upper side.

The reflection part 230 may be defined as an area, in which the light input to the second light input part 212 is totally reflected.

The light reflected by the reflection part 230 may travel to a front side in parallel to the forward/rearward direction. A height of the vertical focus of the reflection part 230 in the upward/downward direction "H" may correspond to a height of the central facet focus CF in the upward/downward direction "H". Meanwhile, the aspect that the height of the central facet focus CF corresponds to the height of the vertical focus of the reflection part 230 in the upward/downward direction "H" may be construed as a concept including not only a case, in which the central facet focus CF crosses the height of the vertical focus of the reflection part 230 in the vertical direction "H", but also a case, in which the height of the central facet focus CF is different from the height of the vertical focus of the reflection part 230 in the upward/downward direction "H" but is close thereto whereby it is understood by an ordinary person in the part to which the present disclosure pertains that substantially the same effects may be shown as compared with a case, in which the height of the central facet focus CF and the height of the vertical focus of the reflection part 230 in the upward/downward direction "H" are the same. The concept of the correspondence also may be understood in a relationship between other objects (as an example, configurations) in the following.

The reflection part 230 may be disposed between the light input part 210 and the light output part 220, in the forward/rearward direction. For example, the reflection part 230 may extend from a rear end of the second light input part 212 to a front side. Furthermore, the reflection part 230 may be connected to a front end of the light output part 220. The reflection part 230 may include a reflection area that has a curved surface to have a shape that is convex toward a rear side. In more detail, the reflection area may have a shape that is convex in a direction that becomes farther from a central line. The reflection part 230, the light input part 210, and the light output part 220, as an example, may be formed integrally.

Figure 5:
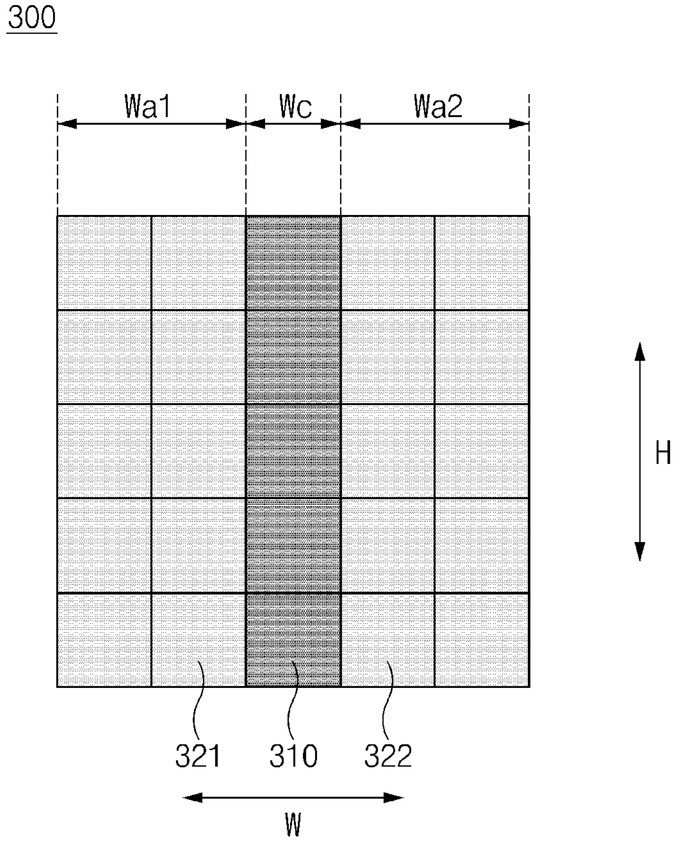
FIG. 5 is a front view of a multi-facet lens according to a first embodiment of the present disclosure.

Referring further to FIG. 5, the light that is output from the light output part 220 and passes through the shield 400 may be input to the multi-facet lens 300 and may be output to an outside after passing therethrough. The multi-facet lens

300 may include a plurality of facets. The multi-facet lens 300 may include a central facet area 310 and a peripheral facet area 320.

The central facet area 310 may include a plurality of facets (hereinafter, a plurality of central facets) that are provided in a central area of the multi-facet lens 300 in the leftward/rightward direction "W". The plurality of central facets may be arranged in the upward/downward direction "H". Furthermore, a center of the central facet area 310 may correspond to the center line CL.

Horizontal focuses and vertical focuses of at least some of the plurality of central facets may correspond to each other. The plurality of central facets, for example, may be single vision lenses. For example, the horizontal focus and the vertical focus of the central facet area may coincide with each other. One focus formed by the central facet area 310 may be named as the central facet focus CF.

Furthermore, when the lamp 10 is viewed from an upper side, normal vectors at the centers of the plurality of central facets may be formed in parallel to the forward/rearward direction. The central facet focus CF may be located between the light output part 220 and the multi-facet lens 300 in the forward/rearward direction. Moreover, the central facet focus CF may be positioned at a location corresponding to the center line CL. The light output from the central facet area 310 may form a central light distribution of the low beam area.

As described above, according to the present disclosure, the light output from the multi-facet lens 300 may form a low-beam light distribution pattern. A central light distribution area may be formed in a central area of the low-beam light distribution pattern. A cutoff line area may be formed at an upper border of the central light distribution area. The cutoff line area may be defined as a site of the low beam area, which has the highest light density. A step may be formed in the cutoff line area. Furthermore, the central light distribution may have a form, in which the light density becomes lower as it goes farther from the cutoff line area.

The cutoff line area may be defined by a cutoff line of the shield 400, which will be described below. The cutoff line of the shield 400 will be described in detail in a paragraph, in which the shield 400 is described.

The peripheral facet area 320 may include a plurality of facets (hereinafter, a plurality of peripheral facets) that are provided on one side of the central facet area 310 in the leftward/rightward direction. The plurality of peripheral facets may be arranged in the upward/downward direction "H". The plurality of peripheral facets, for example, may be anamorphic lenses. The anamorphic lenses are lenses, of which horizontal focuses and vertical focuses are different, and contents of the anamorphic lenses will be replaced by the contents of the conventionally known technology.

Horizontal focuses and vertical focuses of at least some of the plurality of peripheral facets may be different. For example, the vertical focuses of the plurality of peripheral facets may correspond to the central facet focus CF. In detail, the vertical focuses of the plurality of peripheral facets, the central facet focus CF, the vertical focus of the first light input part 211, the vertical focus of the second light input part 212, and the vertical focus of the reflection part 230 may correspond to each other in the upward/downward direction and the forward/rearward direction, ad may be spaced apart from each other in the leftward/rightward direction "W".

Meanwhile, the horizontal focuses of the plurality of peripheral facets may be disposed on a rear side of the light source 100. The light output from the peripheral facet area 320 may form a peripheral light distribution area of the low-beam light distribution pattern. A width of the peripheral light distribution area in the leftward/rightward direction "W" may be larger than a width thereof in the upward/downward direction "H". In other words, a spreading angle of the light output from the peripheral facet area 320 in the leftward/rightward direction "W" may be larger than a spreading angle thereof in the upward/downward direction "H". A spreading angle of the light output from the peripheral facet area 320 in the leftward/rightward direction "W" may be determined according to a width of the peripheral facet area 320 in the leftward/rightward direction "W" and curvatures of the facets provided in the peripheral facet area 320, in the leftward/rightward direction "W". Furthermore, a spreading angle of the peripheral facet area 320 in the upward/downward direction "H" may be determined according to a width of the peripheral facet area 320 in the upward/downward direction "H" and curvatures of the facets provided in the peripheral facet area 320, in the upward/downward direction "H". In other words, a spreading angle of a conventional anamorphic lens is adjusted by adjusting a focal distance, but according to the present disclosure, a spreading angle may be adjusted by individually adjusting curvatures of the plurality of facets provided in the multi-facet lens 300. That is, the cutoff is formed such that the focus of the light output part 220 in the vertical direction "H" corresponds to the central facet focus CF and the focal distance of the peripheral facet area 320 is formed to be close to the infinity or, to the contrary, is formed to be very short to form a light distribution, and the spreading angle may be additionally adjusted by adjusting the curvatures of the plurality of facets provided in the peripheral facet area 320.

The peripheral facet area 320 may include a first peripheral area 321 and a second peripheral area 322.

The first peripheral area 321 and the second peripheral area 322 may be disposed on left and right sides of the central facet area 310, respectively. For example, the first peripheral area 321 may be disposed on the right side of the central facet area 310, and the second peripheral area 322 may be disposed on the left side of the central facet area 310.

Referring back to FIG. 2, when viewed from an upper side of the lamp 10, the normal vectors at the centers of the plurality of peripheral facets (hereinafter, the plurality of first peripheral facets) provided in the first peripheral area 321 may be formed in a direction that is skewed from the forward/rearward direction. For example, when viewed from an upper side of the lamp 10, the normal vector at the centers of the plurality of first peripheral facets may be formed to be inclined in a direction (for example, to the right side) that becomes farther from the center line CL.

When viewed from an upper side of the lamp 10, the normal vectors at the centers of the plurality of peripheral facets (hereinafter, the plurality of second peripheral facets) provided in the second peripheral area 322 may be formed in a direction that is skewed from the forward/rearward direction. For example, when viewed from an upper side of the lamp 10, the normal vector at the centers of the plurality of second peripheral facets may be formed to be inclined in a direction (for example, to the left side) that becomes farther from the center line CL.

Furthermore, a width Wa1 of the first peripheral area 321 in the leftward/rightward direction "W" and a width Wa2 of the second peripheral area 322 in the leftward/rightward direction "W" may be larger than a width We of the central facet area 310 in the leftward/rightward direction "W". This means that a width of the central light distribution area in the leftward/rightward direction "W" may be larger than a width of the peripheral light distribution area in the leftward/rightward direction "W", in the low-beam light distribution pattern. Furthermore, widths of the first peripheral area 321 and the second peripheral area 322 in the upward/downward direction "H", for example, may correspond to a width of the central facet area 310 in the upward/downward direction "H".

Because the central facet area 310 for defining the cutoff line area and the peripheral facet area 320 for defining a peripheral area are provided in the multi-facet lens 300, the functions of forming the cutoff line area and the peripheral area may be distributed. Furthermore, because the first light input part 211 that inputs the light to the central facet area 310 and the reflection part 230 that inputs the light to the peripheral facet area 320 are provided, the function of inputting the light to the central facet area 310 and the peripheral facet area 320 may be distributed. In more detail, most of the light output from the first light input part 211 may reach the central facet area 310, and most of the light output from the second light input part 212 may reach the peripheral facet area 320. Accordingly, glares may be prevented from being generated around the cutoff line area by the light output from the peripheral facet area 320 by restraining the light that is to be input to the peripheral facet area 320 from intruding to the central facet area 310 whereby dazzling of a driver of another vehicle or a pedestrian may be prevented from being generated.

The shield 400 may shield a portion of the light that is output from the inner lens 200 and faces the multi-facet lens 300 to form a low beam area. The shield 400 may be disposed on a front side of the inner lens 200, and may be disposed on a rear side of the multi-facet lens 300. A cutoff line may be formed at a lower end of the shield 400.

A step may be formed in the cutoff line. A cutoff line area may be formed at an upper border of the low-beam light distribution pattern due to the step of the cutoff line. Furthermore, the cutoff line may correspond to the center line CL.

Figure 6:
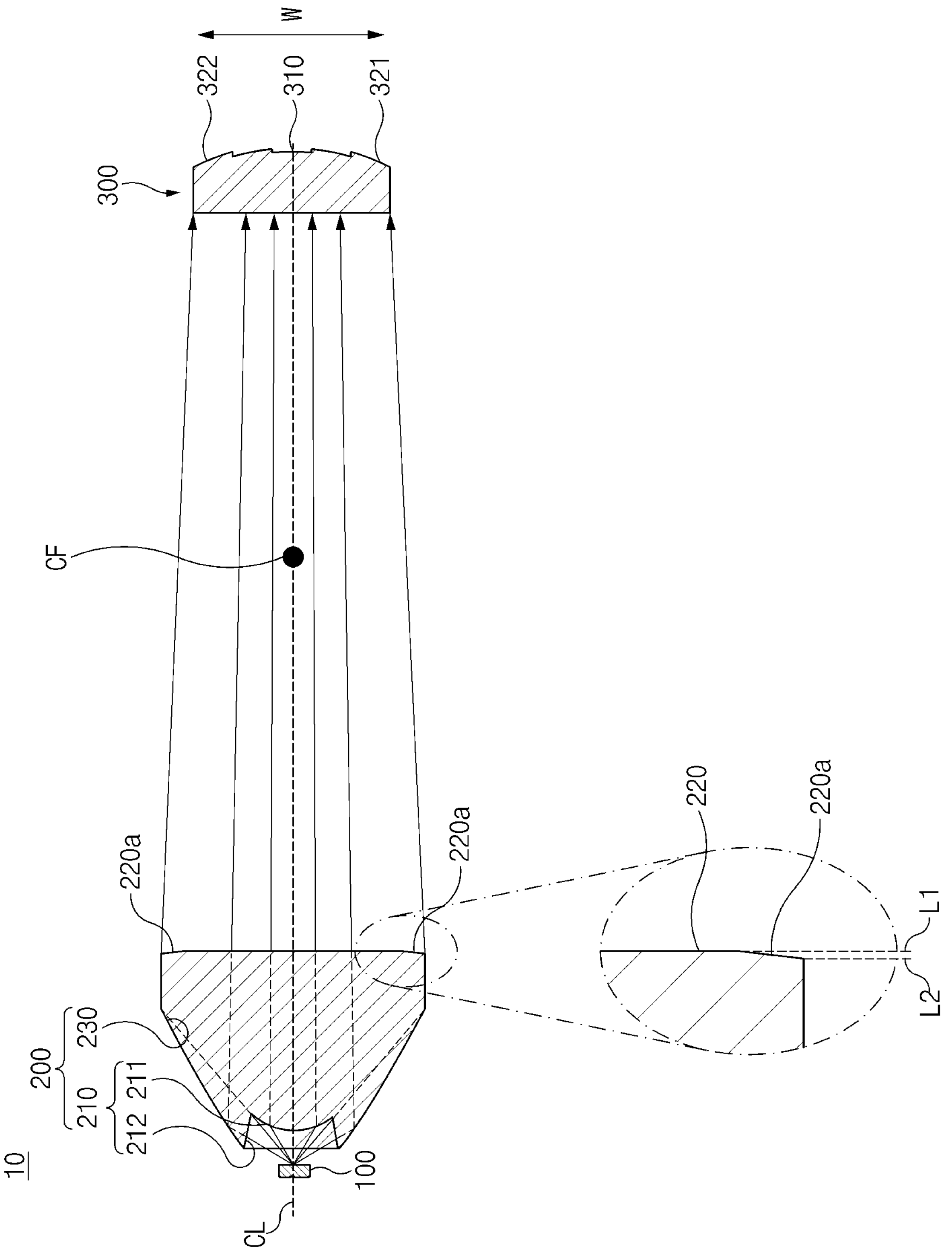
FIG. 6 is a transverse cross-sectional view, which is obtained by cutting a lamp for a vehicle in a horizontal direction, according to a second embodiment of the present disclosure.

Hereinafter, a second embodiment of the present disclosure will be described with reference to FIG. 6. Referring to FIG. 6, a width of the inner lens 200 in the leftward/rightward direction "W" may be larger than a width of the multi-facet lens 300 in the leftward/rightward direction "W". Furthermore, when the lamp 10 is viewed from an upper side, an area having a shape that is convex toward a front side may be provided at a periphery of the light output part 220 in the leftward/rightward direction "W". A convex area 220*a* that is an area having a shape that is convex to a front side may be provided at a periphery of the light output part 220 in the leftward/rightward direction "W", and an area having a flat shape may be provided at a central portion of the light output part 220 in the leftward/rightward direction "W".

For example, a first line L1 that passes a central portion of the light output part 220 in the leftward/rightward direction "W" and extends along the leftward/rightward direction "W" may be disposed on a front side of a second line L2 that passes through a rear end of the convex area 220*a* and extends along the leftward/rightward direction "W". In a more detailed example, the convex area 220*a* may have a shape that is convex in a direction that becomes farther from the center line CL.

The light output from the convex area 220*a* of the light output part 220 may travel while being inclined toward the center line CL. In this way, because the light output from the light output part 220 is input to the multi-facet lens 300 through the convex area 220*a* of the light output part 220 even though a width of the inner lens 200 in the leftward/rightward direction "W" is larger than a width of the multi-facet lens 300 in the leftward/rightward direction "W", a light input efficiency of the multi-facet lens 300 is enhanced.

Furthermore, the light that is output from the light output part 220 after being input to the first light input part 211 may travel in a direction that is parallel to the center line CL. In other words, the light input to the first light input part 211 may be output as parallel light at a central portion of the light output part 220 in the leftward/rightward direction "W".

The lamp for a vehicle equipped with the multi-facet lens may form a low-beam light distribution pattern that may satisfy the rules required for the low-beam light distribution pattern.

Although the present disclosure has been described above with reference to the limited embodiments and drawings, the present disclosure is not limited thereto, and it is apparent that various embodiments may be made within the technical spirits of the present disclosure and an equivalent range of the claims, which will be described below.

What is claimed is:

1. A lamp for a vehicle comprising:

a light source configured to output light; and a multi-facet lens, to which the light output from the light source is input, and being configured to output the light after the light passes therethrough, wherein the multi-facet lens comprises:

a central facet area comprising a plurality of facets provided in a central area in a leftward/rightward direction; and a peripheral facet area comprising a plurality of facets provided on one side of the central area in the leftward/rightward direction, wherein horizontal focuses and vertical focuses of at least some of the plurality of facets provided in the central facet area correspond to each other, and wherein horizontal focuses and vertical focuses of some of the plurality of facets provided in the peripheral facet area are different; further comprising:

an inner lens provided on a front side of the light source and a rear side of the multi-facet lens, and from which the light is output to a front side after the light is input and passes therethrough, wherein the inner lens comprises:

a light input part to which the light is input; and a reflection part extending from the light input part to the front side and configured to totally reflect the light input to the light input part, wherein the light input part comprises:

a first light input part to which any portion of the light input to the light input part is input, wherein the light totally reflected by the reflection part travels in parallel to a forward/rearward direction, and wherein the light input to the first light input part travels parallel to the forward/rearward direction.

2. The lamp of claim 1, wherein horizontal focuses and vertical focuses of all facets provided in the central facet area coincide with each other, and horizontal focuses and vertical focuses of all facets provided in the peripheral facet area are different.

3. The lamp of claim 2, wherein the upward/downward focuses and the forward/rearward focuses of all facets provided in the central facet area and the upward/downward focuses and the forward/rearward focuses of all facets provided in the peripheral facet area correspond to each other.

4. The lamp of claim 1, wherein horizontal focuses of all facets provided in the peripheral facet area are located on a rear side of the light source.

5. The lamp of claim 1, wherein:

the light output from the central facet area forms a central light distribution area of a low-beam light distribution pattern, and the light output from the peripheral facet area forms a peripheral light distribution area of the low-beam light distribution pattern.

6. The lamp of claim 1, wherein the peripheral facet area comprises:

a first peripheral area disposed on any one of a left side and a right side of the central facet area; and a second peripheral area disposed on the other one of the left side and the right side of the central facet area, and wherein a width of the central facet area in the leftward/rightward direction is smaller than widths of the first peripheral area and the second peripheral area in the leftward/rightward direction.

7. The lamp of claim 1, wherein the plurality of facets provided in the central facet area and the plurality of facets provided in the peripheral facet area are arranged along an upward/downward direction.

8. The lamp of claim 1, wherein:

a horizontal focus and a vertical focus of the first light input part coincide with each other, and the focuses of the first light input part correspond to a focus of at least one of the plurality of facets provided in the central facet area.

9. The lamp of claim 1, wherein the first light input part comprises:

a first light input area defining a left part of the first light input part; and a second light input area defining a right part of the first light input part, wherein upward/downward heights of vertical focuses of the first light input area and the second light input area correspond to each other, and wherein horizontal focuses of the first light input area and the second light input area are spaced apart from each other in the leftward/rightward direction.

10. The lamp of claim 9, wherein:

the horizontal focus of the first light input area is disposed on a left side of the horizontal focuses of at least some of the plurality of facets provided in the central facet area when the lamp is viewed from an upper side, and the horizontal focus of the second light input area is disposed on a right side of the horizontal focuses of at least some of the plurality of facets provided in the central facet area when the lamp is viewed from the upper side.

11. The lamp of claim 1, wherein the first light input part has a shape that is convex to a rear side.

12. The lamp of claim 1, wherein the light input part further comprises:

a second light input part to which the other portion of the light input to the light input part is input, wherein the second light input part extends from a front end of the first light input part to a rear side.

13. The lamp of claim 12, wherein:

a concave area having a shape that is concave to a rear side and facing the light source is provided on a rear side of the inner lens, a front surface of the first light input part defines a front part of the concave area, an inner peripheral surface of the second light input part defines a circumferential part of the concave area, and the circumferential part of the concave area extends from the front part to a rear side.

14. The lamp of claim 1, wherein the inner lens further comprises:

a light output part extending from the reflection part, defining a front surface of the inner lens, from which at least a portion of the light input to the light input part is output, and provided at a front end of the reflection part, wherein the light output part is disposed on a rear side of the focus of the central facet area.

15. The lamp of claim 14, wherein the light output part has a shape that extends in a direction that is parallel to the leftward/rightward direction when an upper side of the lamp is viewed.

16. The lamp of claim 14, wherein:

an area having a shape that is convex toward a front side when the lamp is viewed from an upper side is provided at a periphery of the light output part in a leftward/rightward direction, and the light output from an area provided at the periphery of the light output part in the leftward/rightward direction travels to a front side while being inclined toward the central facet area.

17. The lamp of claim 16, wherein a width of the light input part in the leftward/rightward direction is larger than a width of the multi-facet lens in the leftward/rightward direction.

18. The lamp of claim 14, wherein the light output part has a shape that is convex toward a front side when the lamp is viewed from a left side and a right side.

19. The lamp of claim 14, wherein the reflection part is provided between a rear end of the light input part and the light output part and comprises a curved surface to have a shape that is convex toward a rear side.

* * * * *